(12) United States Patent
Thiele et al.

(10) Patent No.: US 9,644,603 B1
(45) Date of Patent: May 9, 2017

(54) ELECTRIC GENERATING WIND TURBINE SYSTEM FOR LOW AND HIGH WIND SPEEDS

(71) Applicant: Amplified Wind Solutions, LLC, Pepper Pike, OH (US)

(72) Inventors: Terry Thiele, Pepper Pike, OH (US); Majid Rashidi, Pepper Pike, OH (US)

(73) Assignee: Amplified Wind Solutions, LLC, Pepper Pike, OH (US)

( * ) Notice: Subject to any disclaimer, the term of this patent is extended or adjusted under 35 U.S.C. 154(b) by 127 days.

(21) Appl. No.: 14/592,427

(22) Filed: Jan. 8, 2015

Related U.S. Application Data

(60) Provisional application No. 61/925,017, filed on Jan. 8, 2014.

(51) Int. Cl.
*F03D 9/00* (2016.01)
*H02P 9/04* (2006.01)
*F03D 7/06* (2006.01)
*F03D 7/00* (2006.01)
*F03D 3/04* (2006.01)
*F03D 3/00* (2006.01)

(52) U.S. Cl.
CPC ........... *F03D 3/0463* (2013.01); *F03D 3/005* (2013.01); *F03D 9/002* (2013.01)

(58) Field of Classification Search
CPC ..................................... F03D 3/00; F03D 9/00
USPC ................................ 290/44, 55; 415/4.2, 4.4
See application file for complete search history.

(56) References Cited

U.S. PATENT DOCUMENTS

| | | | | |
|---|---|---|---|---|
| 103,742 | A * | 5/1870 | Heald | F03B 3/145 415/2.1 |
| 222,256 | A * | 12/1879 | Dewees | F01D 17/18 415/155 |
| 232,558 | A * | 9/1880 | Smith | F03D 3/00 415/156 |
| 273,642 | A * | 3/1883 | Toombs | F03D 3/00 415/4.2 |
| 293,509 | A * | 2/1884 | Petersen | 416/119 |
| 419,345 | A * | 1/1890 | Otto | F03D 3/00 415/122.1 |
| 485,933 | A * | 11/1892 | Herman | 416/119 |
| 1,586,914 | A * | 6/1926 | Palm | F03D 3/0418 415/150 |
| 2,335,817 | A * | 11/1943 | Topalov | F03B 17/063 415/3.1 |

(Continued)

*Primary Examiner* — Tulsidas C Patel
*Assistant Examiner* — Joseph Ortega
(74) *Attorney, Agent, or Firm* — Renner, Otto, Boisselle & Sklar, LLP (57) ABSTRACT

An electrical power generating system includes a wind deflecting structure having a contour at a proximal end formed by a plurality of sail segments that in a first position define the contour, a turbine positioned in proximity to a distal end of the wind deflecting structure such that the turbine is driven by wind passing around the wind deflecting structure, and an energy converter coupled to the turbine that converts rotary motion from the turbine into electrical energy, wherein at least one of the plurality of sails is movable between the first position defining a corresponding portion of the contour of the wind deflecting structure and a second position that reduces a wind drag coefficient of the wind deflecting structure.

22 Claims, 7 Drawing Sheets

(56) References Cited

U.S. PATENT DOCUMENTS

| | | | | |
|---|---|---|---|---|
| 4,037,983 | A * | 7/1977 | Poeta | F03D 3/02 415/4.2 |
| 4,156,580 | A * | 5/1979 | Pohl | F03D 3/02 290/55 |
| 4,486,143 | A * | 12/1984 | McVey | F03D 3/0427 415/162 |
| 4,551,631 | A * | 11/1985 | Trigilio | F03D 3/0409 290/1 R |
| 4,764,683 | A * | 8/1988 | Coombes | F03D 3/0454 290/44 |
| 4,830,570 | A * | 5/1989 | Benesh | F03D 3/02 415/4.4 |
| 5,375,968 | A * | 12/1994 | Kollitz | F03D 3/0409 415/2.1 |
| 5,391,926 | A * | 2/1995 | Staley | F03D 3/0409 290/44 |
| 5,553,996 | A * | 9/1996 | Farrar | F03D 3/065 415/2.1 |
| 6,499,939 | B2 * | 12/2002 | Downing | F03B 17/065 415/3.1 |
| 6,966,747 | B2 * | 11/2005 | Taylor | F03D 3/0409 415/1 |
| 7,323,791 | B2 * | 1/2008 | Jonsson | F03D 3/0418 290/44 |
| 7,518,258 | B1 | 4/2009 | Marvin | |
| 7,540,706 | B2 | 6/2009 | Rashidi | |
| 7,679,209 | B2 | 3/2010 | Rashidi | |
| 7,728,450 | B2 | 6/2010 | Marvin | |
| 7,845,904 | B2 | 12/2010 | Rashidi | |
| 8,002,516 | B2 | 8/2011 | Rashidi | |
| 8,167,533 | B2 | 5/2012 | Lucy et al. | |
| 9,404,477 | B2 * | 8/2016 | Carter | F03D 7/06 |
| 2003/0175109 | A1 * | 9/2003 | Brock | F03D 3/002 415/4.2 |
| 2004/0141845 | A1 * | 7/2004 | Ohlmann | F03D 3/02 416/132 B |
| 2004/0219019 | A1 * | 11/2004 | Taylor | F03D 3/0409 416/132 B |
| 2008/0124217 | A1 | 5/2008 | Friesth | |
| 2008/0315585 | A1 | 12/2008 | Marvin | |
| 2009/0015017 | A1 | 1/2009 | Rashidi | |
| 2009/0087301 | A1 * | 4/2009 | Krouse | F03B 3/18 415/4.3 |
| 2009/0167026 | A1 | 7/2009 | Marvin | |
| 2009/0184521 | A1 * | 7/2009 | Chong | F03D 3/049 290/55 |
| 2009/0238676 | A1 | 9/2009 | Marvin | |
| 2011/0291421 | A1 * | 12/2011 | Tsung | F03D 3/0409 290/55 |
| 2012/0020788 | A1 | 1/2012 | Lucy | |
| 2012/0045328 | A1 | 2/2012 | Rashidi | |
| 2012/0051939 | A1 | 3/2012 | Marvin et al. | |
| 2013/0149131 | A1 * | 6/2013 | O'Keefe | F03D 11/00 415/208.1 |
| 2013/0170986 | A1 * | 7/2013 | Steel | F03D 3/04 416/5 |
| 2014/0252770 | A1 * | 9/2014 | Patel | F03D 9/021 290/50 |
| 2014/0252773 | A1 * | 9/2014 | Patel | F03D 3/005 290/55 |
| 2015/0233354 | A1 * | 8/2015 | Patel | F03D 9/002 290/55 |
| 2015/0233358 | A1 * | 8/2015 | Patel | F03D 11/04 307/48 |

* cited by examiner

ELECTRIC GENERATING WIND TURBINE SYSTEM FOR LOW AND HIGH WIND SPEEDS

RELATED APPLICATIONS

This application claims the benefit of U.S. Provisional Application No. 61/925,017 filed Jan. 8, 2014, which is hereby incorporated herein by reference.

FIELD OF INVENTION

The present invention relates generally to wind turbines, and more particularly to an electric generating wind turbine system.

BACKGROUND

Wind has several material environmental impact advantages over fossil fuels as an energy source for electricity generation. Unlike fossil fuels, wind energy is limitless and free. Wind generates electricity without producing the air emissions that result from fossil fuel combustion.

Wind powered energy generation has been utilized in multiple applications. For example, wind turbines convert kinetic energy from wind into mechanical energy to produce electricity. Generally, wind energy is greater when wind speed is higher and wind energy is lower when wind speed is lower. The amount of energy the wind turbine is able to convert is a function of the extraction of wind power by the turbine, which is believed to be limited ordinarily to about 59.3 percent according to Betz' law.

U.S. Pat. No. 7,679,209 discloses an electrical energy generating system used to convert wind power to electrical power with a wind deflecting structure that divides wind impinging on the structure into two separate accelerated flow paths. One or more vertical or horizontal axis turbines are positioned in proximity to the wind deflecting structure such that the turbine is placed within one of the accelerated flow paths. An energy converter is coupled to the turbine that converts rotary motion of the turbine into electricity.

SUMMARY OF INVENTION

The present invention provides a wind deflecting structure formed by a plurality of segments independently positionable in a first position for deflecting wind and a second position in which a wind drag coefficient of the wind deflecting structure is reduced.

According to one aspect of the invention, an electrical power generating system includes a wind deflecting structure having a contour at a proximal end formed by a plurality of segments that in a first position define the contour, a turbine positioned in proximity to a distal end of the wind deflecting structure such that the turbine is driven by wind passing around the wind deflecting structure, and an energy converter coupled to the turbine that converts rotary motion from the turbine into electrical energy, wherein at least one of the plurality of segments is movable between the first position defining a corresponding portion of the contour of the wind deflecting structure and a second position that reduces a wind drag coefficient of the wind deflecting structure.

Optionally, in the first position the contour increases in width from the proximal end to the distal end.

Optionally, the second position allows wind to pass through the wind deflecting structure thereby reducing the wind drag coefficient of the wind deflecting structure.

Optionally, the wind deflecting structure at least partially shields the turbine.

Optionally, a tangent axis that extends distally from an outer face of the contour of the wind deflecting structure is parallel to, but off-set from, a central wind axis and intersects a distal end of the contour and a sweep path of the turbine.

Optionally, the tangent axis intersects a central portion of the sweep path of the turbine.

Optionally, one or more of the at least one of the plurality of segments are each pivotally connected as part of the wind deflecting structure through a respective biasing hinge.

Optionally, two or more of the at least one of the plurality of segments are each pivotally connected as part of the wind deflecting structure through respective biasing hinges.

Optionally, the biasing hinge is one of a gravity hinge, a spring loaded hinge, or a double action hinge.

Optionally, the biasing hinge is configured to pivot when wind impinging the wind deflecting structure exceeds a predetermined speed.

Optionally, the biasing hinge is biased against pivoting in a counterclockwise or a clockwise direction.

Optionally, at least one radially outwardly extending arm extends from a central vertical support member to the biasing hinge.

Optionally, at least one radially outwardly extending arm extends from a central vertical support member.

Optionally, at least one sill extends from an outward end of at least one of the plurality of radially outwardly extending arms to an outward end of a second radially outwardly extending arm of the plurality of radially outwardly extending arms.

Optionally, at least one sill is of a shape that follows a curvature of the at least one of the plurality of segments perpendicularly to a longitudinal axis of the at least one of the plurality of segments.

Optionally, at least one of the plurality of segments is a sail-type structure.

Optionally, a yaw mechanism is configured to rotate the wind deflecting structure to face the wind.

Optionally, the wind deflecting structure is pivotally connected to a foundation.

Optionally, the wind deflecting structure is rotatably mounted relative to a ground location.

Optionally, a top sill, a bottom sill, and an axle mounted along a longitudinal axis of the at least one of the plurality of segments and configured to mount the at least one of the plurality of segments to the sills.

According to another aspect of the invention, a method of generating electrical power includes the steps of directing wind to at least one turbine in proximity to a distal end of a wind deflecting structure having a contour at a proximal end formed by a plurality of segments that in a first position define the contour such that the turbine is driven by wind passing around the wind deflecting structure, converting rotary motion from the turbine into electrical energy, and reducing a wind drag coefficient of the wind deflecting structure in a second position by moving at least one of a plurality of segments of the wind deflecting structure.

Optionally, a step of rotating the at least one of a plurality of segments independent of the wind deflecting structure.

The foregoing and other features of the invention are hereinafter described in greater detail with reference to the accompanying drawings.

DETAILED DESCRIPTION

A problem that may be encountered by wind driven electric power generating systems is that high wind speed may damage wind turbines and/or other parts of the electric power generating systems that are exposed to the wind. For example, high wind speed may damage a wind deflecting structure and a wind turbine proximate to the wind deflecting structure. Another problem is that wind may quickly change direction and damage the wind turbine or the wind deflecting structure. For example, a prevailing wind may move in a distal direction, and the wind may suddenly reverse or alter course and move in a proximal direction placing a wind load in a different direction, which may place additional load in the proximal direction on the wind turbine and/or the wind deflecting structure. Heavier duty materials or expensive control systems may be employed to try to avoid these problems, but these add additional weight and cost to the electric power generating system. The present application discloses reducing a wind drag coefficient of the wind deflecting structure of a wind driven electric power generating system to address one or more of these problems, preferably without requiring substantial additional cost or weight.

Another problem that may be encountered by wind driven electric power generating systems is that wind turbines do not function optimally at low wind speeds or at high wind speeds. For example, a wind deflecting structure may amplify the wind speed around the wind deflecting structure to drive a wind turbine in proximity, but the wind turbine may lose functionality when high amplified wind speeds drive the wind turbine. Heavier duty materials or expensive control systems may be employed to try to alleviate this problem, but these add additional weight and cost to the electric power generating system. The present application discloses reducing a wind drag coefficient of the wind deflecting structure controllably to reduce wind amplification to a proximate wind turbine.

Another problem that may be encountered by wind powered electrical power generating systems is that wind may back-drive wind turbines, which may reduce functionality of the wind turbine. For example, a turbine with a rotational axis perpendicular to the wind may be driven by wind against one side of the wind turbine and back driven by wind against the other side of the turbine. The present application discloses shielding a side of the wind turbine from the wind to minimize back-driving of the turbine.

Figure 1:
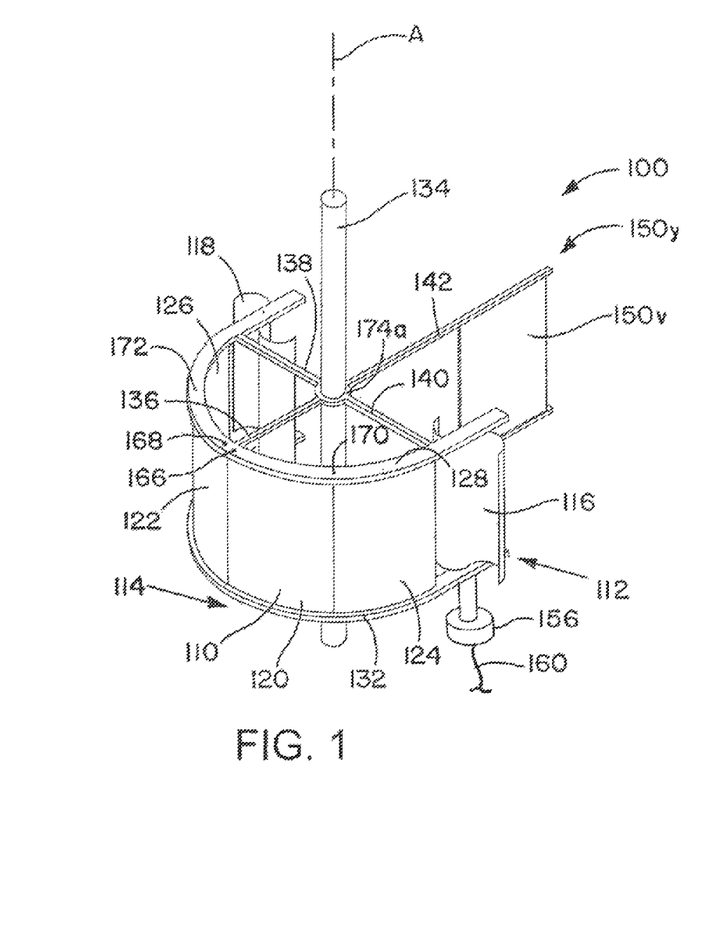
FIG. 1 is a perspective view looking from the front of an electrical power generating system in accordance with an embodiment of the present application that utilizes a plurality of segments movable between a first position and a second position, the segments being shown in a first position or orientation.
Figure 2:
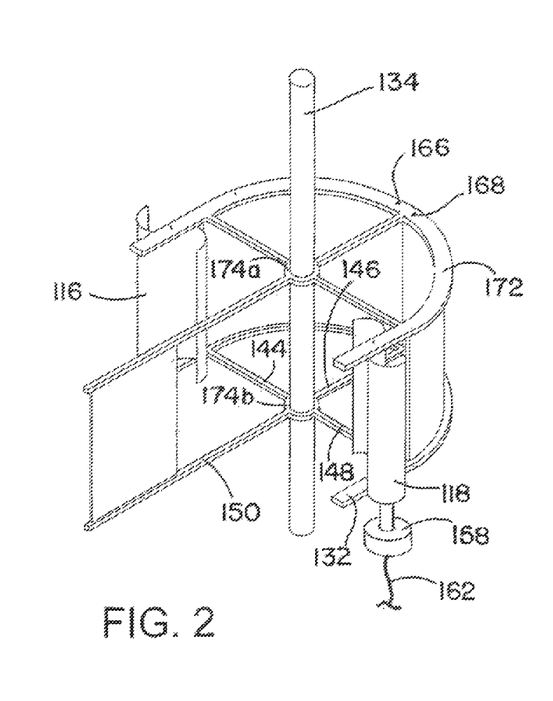
FIG. 2 is a perspective view looking from the back of the electrical power generating system of FIG. 1.

FIGS. 1 and 2 are perspective views of an electrical power generating system 100 in accordance with an embodiment of the present application including a wind deflecting structure 110 and one or more turbines 116, 118. The wind deflecting structure 110 includes a plurality of segments 120, 122, 124, 126, 128, 132. The segments 120, 122, 124, 126 may be referred to as sails, and the segments 128, 132 may be referred to as sills. In an embodiment the sails are rotatably coupled to respective sills, as is described further below. At least one of the sails (segments) 120, 122, 124, 126 is movable between a first position or orientation and a second position or orientation (for the description herein the terms position and orientation may be used equivalently and interchangeably). The number of segments may be more or fewer than those illustrated. The electrical power generating system 100 also includes a central vertical support member 134, a plurality of radially extending arms 136, 138, 140, 142, 144, 146, 148, 150 and a yaw mechanism 152$y$. In the illustration of FIG. 1 the wind deflecting structure 110 is at a proximal (or front or forward) part or end of the electrical power generating system 100, and the turbines 116, 118 are relatively distal (or rearward) part or end of the wind deflecting structure.

As an example of using the electrical power generating system 100, suitable wind flow directed to the front of the wind deflecting structure 110 may follow the contour of the wind deflecting structure 100 and impinge on the turbines, which may be mechanically coupled as shown to an energy converter, such as electrical generators 156, 158 that provide electrical output at wires 160, 162. In the event there is high speed air impingement on the front of the wind deflecting structure 110, at least one of the segments 120, 122, 124, 126 may open to dump, spill or redirect some of the air flow from completing a path to the turbines 116, 118, thus, reducing the wind drag coefficient of the wind deflecting structure 110, and avoiding damage to the turbines 116, 118. As is further described below, the wind deflecting structure 110 may be rotatable, for example, about the central vertical support member 134 to allow effective operation for various impinging wind directions.

The wind deflecting structure 110 may have a generally cylindrical shape that amplifies wind speed around the wind deflecting structure 110. U.S. Pat. No. 7,679,209 exemplifies this wind amplification effect when using a deflector that progressively widens toward a distal end of the wind deflector in proximity to a wind turbine. In some embodiments the wind deflecting structure 110 is between 30 and 60 feet in height and 10-40 feet in diameter. It is noted that the wind deflecting structure 110 may be any shape capable of deflecting wind and may be of a different size than was just mentioned by way of example. The wind deflecting structure 110 may connect to turbines 116, 118 each proximate to a respective distal end 112 of the wind deflecting structure 110. Turbine 118 may connect to a different side of the wind deflecting structure 110 than the turbine 116, e.g., as is illustrated in FIGS. 1 and 2.

The central vertical support member 134 may extend parallel to a longitudinal axis A. The axis A is defined by a curvature of the wind deflecting structure 110. For example, the axis A may be generally perpendicular to a cord of the curve of the wind deflecting structure illustrated in FIGS. 1 and 2 or may be generally parallel to the axis of rotation of one of the segments 120, 122, 124, 126, which rotation is described further below. One or more radially outwardly extending arms 136, 138, 140, 144, 146, 148 extend from the central vertical support member 134 to support the wind deflecting structure 110 from the central vertical support member.

The radially outwardly extending arms (for brevity sometimes referred to herein as "arms") 136, 138, 140 (seen in FIG. 1), 144, 146, 148 (seen in FIG. 2) may be rotatably connected to the central vertical support member 134 in a manner allowing the arms and, thus, the wind deflecting structure 110 to rotate about the vertical support member. Alternatively, the radially outwardly extending arms 136, 138, 140, 144, 146, 148 may be fixed to the central vertical support member 134 to support the wind deflecting structure 110 connected to the arms preventing such rotation, if desired. As another alternative, the wind deflecting structure 110 may be movably connected (not shown) to the radially outwardly extending arms 136, 138, 140, 144, 146, 148 for support thereby and to allow rotation of the wind deflecting structure 110 relative to the arms 136, 138, 140, 144, 146, 148, if desired.

In an embodiment the arms 136, 138, 140, 142 are connected together by a collar 174a so they are fixed relative to each other. The arms 144, 146, 148, 150 similarly are connected together by a collar 174b. The collars may be rotatably mounted or positioned on the vertical support member 134 to permit rotating about the vertical support member. Alternatively, the collars 174a, 174b may be replaced by a cylindrical bushing or the like rotatable about the vertical support member and to which arms are attached.

The wind deflecting structure 110 may be connected to the yaw mechanism 152y, which may rotate the wind deflecting structure to face the wind that impinges on the wind deflecting structure. The yaw mechanism 152y may be a vane that is located at a relatively distal part of the system 100. The wind deflecting structure may be rotatably connected to the ground, e.g., the earth, or to some other relatively fixed structure (not shown) via the arms and the central vertical support.

The distal vane 152v may be configured to rotate the wind deflecting structure 110 to face the wind. For example, the distal vane 152v may connect to the wind deflecting structure 110 at a distal end 112 through the arms 142, 150. The arms 142, 150 may extend from the central vertical support member 134 and may operably connect the distal vane 152v to the wind deflecting structure 110 to allow the distal vane 152v to control the yaw of the wind deflecting structure 110. For example, the distal vane 152v may be configured to direct the proximal end 114 of the wind deflecting structure 110 to face a prevailing wind. The distal vane 152v may rotate the wind deflecting structure 110 when the prevailing wind places more force against one side or the other of the distal vane 152v.

As another alternative, the yaw mechanism 152y may be any other mechanical or electrical yaw mechanism able to adjust the yaw of the wind deflecting structure 110. For example, a sensor may detect the direction of the prevailing wind and a motor may rotate the wind deflecting structure 110 to face the prevailing wind.

Thus, it will be appreciated that in an embodiment the wind deflecting structure 100 is movable in different directions to tend to face the wind that may come from different directions. In another embodiment the wind deflecting structure may be oriented in a fixed direction.

For example, in an embodiment of the electrical power generating system 100, the wind deflecting structure 110 is in a fixed location, e.g., relative to the ground, a support, tower or building, or the central vertical support member 134 and the wind deflecting structure 110 may be fixedly oriented to face a direction from which the wind most commonly blows. This may be accomplished by fixing the wind deflecting structure 110 to the central vertical support member 134 and fixing the central vertical support member 134 to a foundation in the ground, such as for a building, structure, etc. The arms 136, 138, 140, 144, 146, 148 may be welded to the central vertical support member 134 and welded to the wind deflecting structure 110 so the wind deflecting structure does not rotate.

The wind deflecting structure 110 may have a contour at the proximal end 114 formed by a plurality of sails 120, 122, 124, 126 and sills 128, 132 that in the first position define the contour. At least one of the plurality of sails 120, 122, 124, 126 may be movable between the first position defining a corresponding portion of the contour of the wind deflecting structure and a second position that reduces a wind drag coefficient of the wind deflecting structure 110. As is shown in FIGS. 1 and 2, the first position or orientation of the sails is one in which the sails are closed to form a smooth contour about and along which wind may flow.

Figure 4:
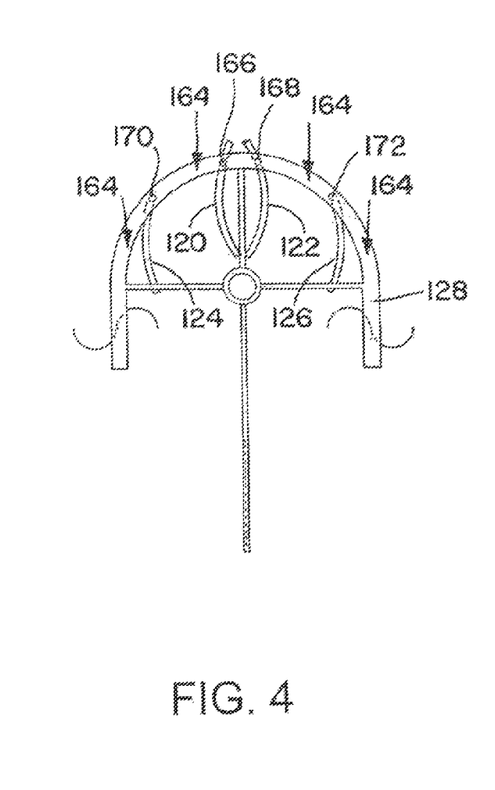
FIG. 4 is a top view of the electrical power generating system of FIG. 1 showing movable segments in a second position or orientation indicative of high winds impinging in a distal direction, e.g., from front toward back.
Figure 5:
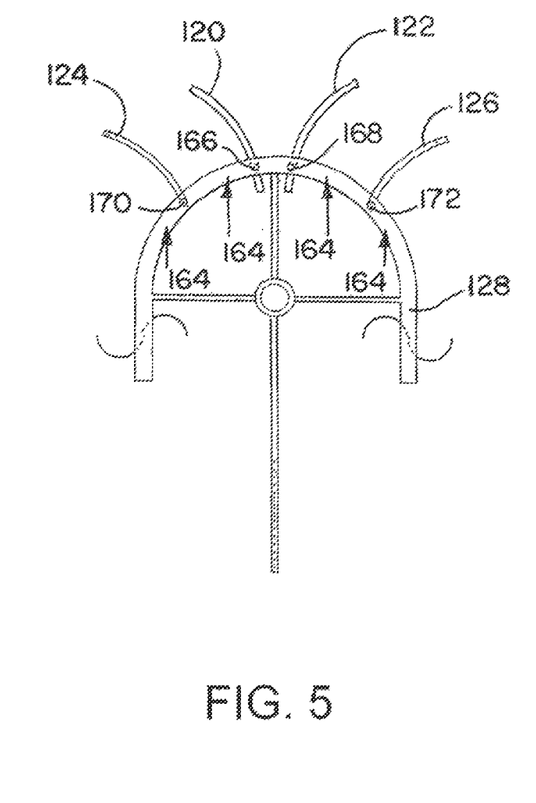
FIG. 5 is a top view of the electrical power generating system of FIG. 1 showing movable segments in a second position or orientation indicative of high winds impinging in a proximal direction, e.g., from back toward front.

FIGS. 4 and 5 each exemplify a second position of the sails 120, 122, 124, 126 in which the sails have moved to open gaps 164 between one or more pairs of relatively adjacent sails (or between a sail and an adjacent structure (not shown) of the wind deflecting structure 110. The gaps 164 allow some air to flow therethrough without flowing along the full extent of the contour of the wind deflecting structure 110. FIG. 4 illustrates the sails 120, 122, 124, 126 open, e.g., rotated toward the distal end of the wind deflecting structure 110, to form gaps 164 for air flow from the proximal (front) end of the wind deflecting structure.

FIG. 5 illustrates the sails 120, 122, 124, 126 open, e.g., rotated toward the proximal end of the wind deflecting structure 110, to form gaps 164 for air flow from the distal (back) end of the wind deflecting structure 110. In an embodiment the sails 120, 122, 124, 126 may rotate in the same direction as one another. For example, the sails 120, 122, 124, 126 may connect to respective biasing hinge assemblies that are configured to rotate each sail 120, 122, 124, 126 counter-clockwise about their respective biasing hinge assemblies in response to wind in a proximal direction.

Each sail 120, 122, 124, 126 may move independently of the other sails 120, 122, 124, 126 or two or more sails may move in unison. In another alternative, each sail 120, 122, 124, 126 has a full range of second positions between a closed first position and a fully open second position or to any extent in between the closed and fully open positions. The open second positions may include sails 120, 122, 124, 126 moving in a distal direction, as in FIG. 4, and moving in the proximal direction, as in FIG. 5, as is mentioned above. In an embodiment a wind speed between 20-40 mph forces the sails 120, 122, 124, 126 into a partially open second position from the first position (shown in FIGS. 1 and 2).

Sill 128 may extend along an outward end of one or more of arms 136, 138, 140, and sill 132 may extend along an outward end of arms 142, 144, 146, 148. For example, the sill 128 may be connected at a radially outward end of arms 138, 136, 140 to prevent relative rotational movement between the sill 128 and the distal vane 152*v*. The sill 132 may be connected at a radially outward end of arms 144, 146, 148 to prevent relative rotational movement between the sills 128, 132 and the distal vane 152*v*. When wind is directed in a distal direction, differences in force on either side of the distal vane 152*v* may cause the distal vane 152*v* to rotate about the central vertical support member 134 to face in a distal direction, away from the wind.

Rotation of the distal vane 152*v* causes rotation of the sills 128, 132 about the central vertical support member 134 to face, toward the wind. As the wind changes direction the distal vane 152*v* may continue to re-orient itself to face away from the wind, which may cause the sills 128, 132 to re-orient to face the wind as the wind changes direction. It is noted that a distal vane 152*v* may be replaced by any other yaw mechanism 152*y* or removed from the electrical power generating system 100 altogether, e.g., if the wind deflecting structure 110 is not intended to rotate.

The turbines 116, 118 may be positioned in proximity to a distal end 112 of the wind deflecting structure 110 such that the turbine 116 is driven by wind passing around the wind deflecting structure 110. For example, the turbine 116 may be connected to one side of the wind deflecting structure 110 and the turbine 118 may be connected to the other. Sills 128, 132 may provide a rotatable bearing surface on which the turbines 116, 118 can be rotated. The turbines 116, 118 may be rotatably connected to a respective distal end 112 of sills 128, 132 to allow rotation about a respective axis parallel to the central vertical support member 134. It is noted that in other examples (not shown), one or both of the turbines 116, 118 may rotate about any axis, for example, an axis perpendicular to the central vertical support member 134.

Various turbine types may be used. For example, turbines 116, 118 may be Savonius vertical axis turbines. In other examples, one or both of the turbines 116, 118 may be a horizontal axis wind turbine, Darrieus wind turbine, Giromil wind turbine, twisted Savonius wind turbine, a "squirrel cage" wind turbine, or nearly any other wind turbine. In an embodiment the turbines 116, 118 operate in wind speeds between 6-40 mph. In another embodiment the turbines 116, 118 operate in wind speeds of 4 mph or higher and amplified by the wind deflecting structure 110.

A separate generator 156, 158 may be rotatably coupled each turbine 116, 118. Each generator may be driven by the turbine 116, 118 to which it is connected. The generators may be unattached or attached to the wind deflecting structure 110 or the central vertical support member 134. The turbines 116, 118 spin the generators 156, 158 to generate electrical power. Wires 160, 162 carrying the generated electrical power may be routed along one of the sills 128, 132, one of the arms 136, 138, 140, 144, 146, 148, or the central vertical support member 134. The wires 160, 162 may exit to a base of the electrical power generating system 100, for example, the lowest portion of the central vertical support member 134. In an embodiment the generators 156, 158 are 2 KW. In another embodiment the generators 156, 158 operate between 300-500 rpm.

As is seen in FIGS. 1-5, sails 120, 122, 124, 126 are rotatably connected to one of or both sills 128, 132 through respective biasing hinge assemblies 166, 168, 170, 172. In an embodiment the sails 120, 122 may be rotatably connected through the same biasing hinge assembly. For example, the biasing hinge assembly 166 may include a spring hinge (shown in FIG. 12) and sails 120, 122 may both connect to the biasing hinge assembly 166.

Sails 120, 122, 124, 126, may be relatively lightweight because they do not need to bear any load beyond withstanding the force of the wind. For example, each sail 120, 122, 124, 126 may be molded as a single piece or multiple pieces of a lightweight material, such as, for example, plastic. The sills 128, 132, which may be formed as separate components, and the sails 120, 122, 124, 126 may each be a sheet of flexible impervious material such as nylon or canvas or an inflated double wall that is wrapped around a frame. Constructing the sails 120, 122, 124, 126 from sheet material leads to the sails 120, 122, 124, 126 being relatively simple and inexpensive to repair or replace.

The sails 120, 122, 124, 126 may form one or more rigid semi-cylindrical sections that define the wind deflecting structure 110. Alternatively, the sails 120, 122, 124, 126 alone or with additional sails (not shown) may cooperate when in closed position to define a full cylinder-shape wind deflecting structure 110. This would allow wind amplification of wind in a proximal or distal direction, and, by rotating one or more sails, reducing a wind drag coefficient of the wind deflecting structure 110.

The wind may place a wind load against the wind deflecting structure 110 as a function of a drag coefficient of the wind deflecting structure 110 and the wind speed. Increasing wind speed increases the wind load against the system 100, including the wind deflecting structure 110 and the turbines 116, 118. By the sails moving to open gaps, wind load at a given wind speed against the front of the wind deflecting structure 110 and against the turbines would be reduced.

Figure 3:
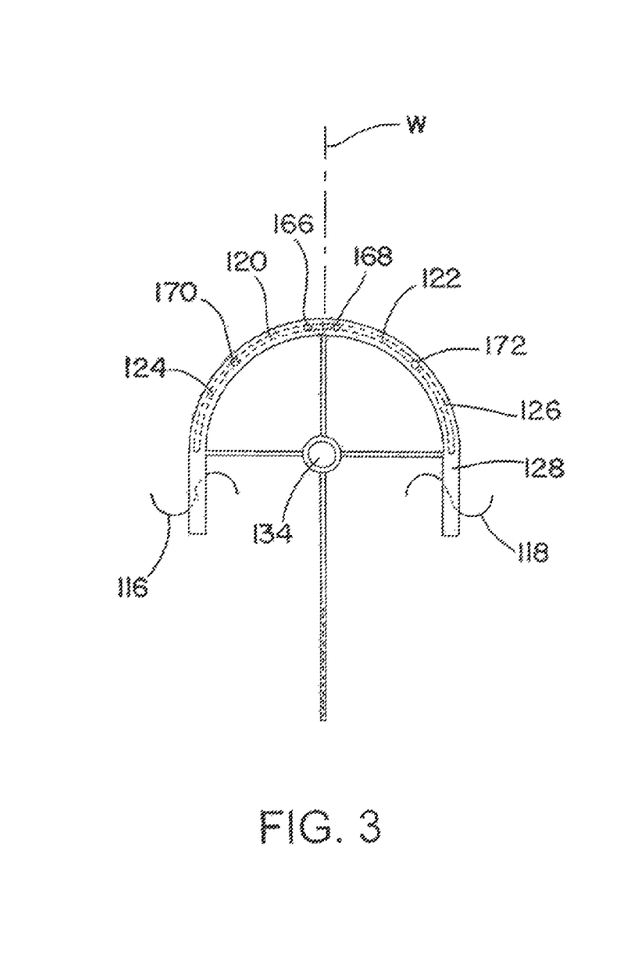
FIG. 3 is a top view of the electrical power generating system of FIG. 1.

Turning now to FIGS. 3-5, each turbine 116, 118 defines a respective sweep path based on the rotation of each turbine's 116, 118 blades. A sweep path is defined by the volume required by a turbine blade to freely rotate about its rotational axis. For example, the turbine 116 rotates about its rotational axis, which is parallel to the central vertical support member 134. The sweep path of turbine 116 defines a cylindrical volume with a length of the axial length of the turbine 116 and a radius of the radial width of the turbine. For example, the sweep path may have a height of 4-5 feet and have a rotational diameter of 3 feet. Turbine 118 defines a sweep path in the same manner. Alternatively, turbines 116, 118 may be a different type of turbine, as mentioned above, within a sweep path of a different shape and orientation.

The wind deflecting structure 110 may at least partially shield the turbines 116, 118. For example, a tangent axis T (FIG. 3) that extends distally from an outer face of the contour of the wind deflecting structure 110 may be parallel to, but off-set from, a central wind axis W (FIG. 3) and intersect a distal end 112 of the contour and a sweep path of the turbine. For example, the rotational axis of turbine 116 may be parallel with a plane extending parallel to the central vertical support member 134 and extend parallel to the tangent axis T. In a further example, the tangent axis may intersect the sweep path of the turbine 116, and the plane may align with and, thus includes the rotational axis of the turbine 116.

In an embodiment the tangent axis T may intersect a central portion of the sweep path of the turbine 116. This configuration allows the wind to exert driving force on one side of the turbine 116 to rotate the turbine, while preventing the wind from exerting back-driving force against the other side of the turbine 116 by shielding the other side of the turbine 116.

Turbine 118 may be similarly situated as described regarding the turbine 116 relative to the other side of the wind deflecting structure 110.

In the first position, the contour of the wind deflecting structure 110 may increase in width from the proximal end 114 to the distal end 112. For example, the contour may be semi-cylindrical. It is noted that the sill 128 and sill 132 (FIG. 1) may be of a shape that follows a curvature of a cross-section of the sails taken perpendicularly to a longitudinal axis of the at least one of the plurality of sails 120, 122, 124, 126. For example, the sills 128, 132 may follow the path of the semi-cylindrical contour of the sails 120, 122, 124, 126 in the first position. This allows the sills 128, 132 to form part of the contour of the wind deflecting structure 110, and to connect to the turbines 116, 118 and the sails 120, 122, 124, 126 allowing them to rotate relative to the respective sill.

In a second position illustrated in FIG. 4 the sails 120, 122, 124, 126 rotate about respective biasing hinge assemblies 166, 168, 170, 172 to reduce a wind drag coefficient of the wind deflecting structure 110. For example, wind may move in a distal direction between 30-50 miles per hour ("mph") and force the sails 120, 122, 124, 126 into a second position (FIG. 4) to reduce the wind drag coefficient of the wind deflecting structure 110 compared to the first position shown, for example, in FIGS. 1 and 2. The wind may force the sails 120, 122, 124, 126 to rotate about respective biasing hinge assemblies 166, 168, 170, 172 to extend distally allowing wind to flow in gaps 164 between the sails 120, 122, 124, 126 and through the wind deflecting structure 110.

Alternatively, in another second position illustrated in FIG. 5 wind may move in a proximal direction and the sails 120, 122, 124, 126 may be forced into the another second position (FIG. 5) to reduce the wind drag coefficient of the wind deflecting structure 110 compared to the first position. In some circumstances the yaw mechanism 152y may not rotate the wind deflecting structure 110 quickly enough or may not be present. The biasing hinge assemblies 166, 168, 170, 172 may include double action hinges to allow the sails 120, 122, 124, 126 to rotate in both directions for circumstances involving sudden reversals of wind direction. In those circumstances, a shift in wind direction may force the sails 120, 122, 124, 126 to rotate about respective biasing hinge assemblies 166, 168, 170, 172 to extend proximally, as is seen in FIG. 5, allowing wind to flow between the sails 120, 122, 124, 126 and through the wind deflecting structure 110. The term double action hinge includes saloon-style door hinges.

It is noted that the wind deflecting structure 110 may form a wind amplification surface with sails 120, 122, 124, 126 independently moveable to allow flow therebetween and through the wind deflecting structure 110. The distal vane 152v may normally orient the proximal end 114 of the wind deflecting structure 110 toward a prevailing wind. Alternatively, a motor or other control system may rotate the wind deflecting structure 110, in response to a detected prevailing wind direction, to face the prevailing wind. However, sometimes wind direction will change drastically. The present application discloses sails 120, 122, 124, 126 that may be moveable in multiple directions to release wind flow in both a proximal or a distal direction, as is described above and is illustrated, for example, by comparing FIGS. 4 and 5.

The wind deflecting structure 110 may modify its shape to reduce the drag coefficient along a path in either the distal direction or the proximal direction. The wind deflecting structure 110 may reduce its drag coefficient by at least 25%. For example, in response to high wind speeds, the wind deflecting structure 110 may modify its shape to reduce its wind drag coefficient by at least 25%. In an embodiment the wind deflecting structure 110 may reduce its drag coefficient by at least 50%. In another embodiment the wind deflecting structure 110 may reduce its drag coefficient by at least 75%.

The wind deflecting structure 110 may be of such shape and orientation described above in a first position for directing wind to at least one turbine 116, 118 in proximity to a distal end 112 of the wind deflecting structure such that the turbine is driven by wind passing around the wind deflecting structure 110. For example, wind may flow in a distal direction against the proximal end 114 of the wind deflecting structure 110 and the wind may continue to flow in a path around the wind deflecting structure to the turbines 116, 118.

The electrical power generating system 100 may be configured for converting rotary motion from the turbines 116, 118 into electrical energy to power local devices or to put energy onto a power grid. The wind deflecting structure 110 may be capable of reducing a wind drag coefficient of the wind deflecting structure in a second position by moving at least one of a plurality of segments of the wind deflecting structure. The electric power generating system 100 may be configured for rotating at least one of the plurality of segments 120, 122, 124, 126, 128, 132 independently of the wind deflecting structure 110. For example, the sails 120, 122, 124, 126 may independently rotate about respective biasing hinge assemblies 166, 168, 170, 172 to allow wind to pass between the sails 120, 122, 124, 126 and through the wind deflecting structure.

Figure 6:
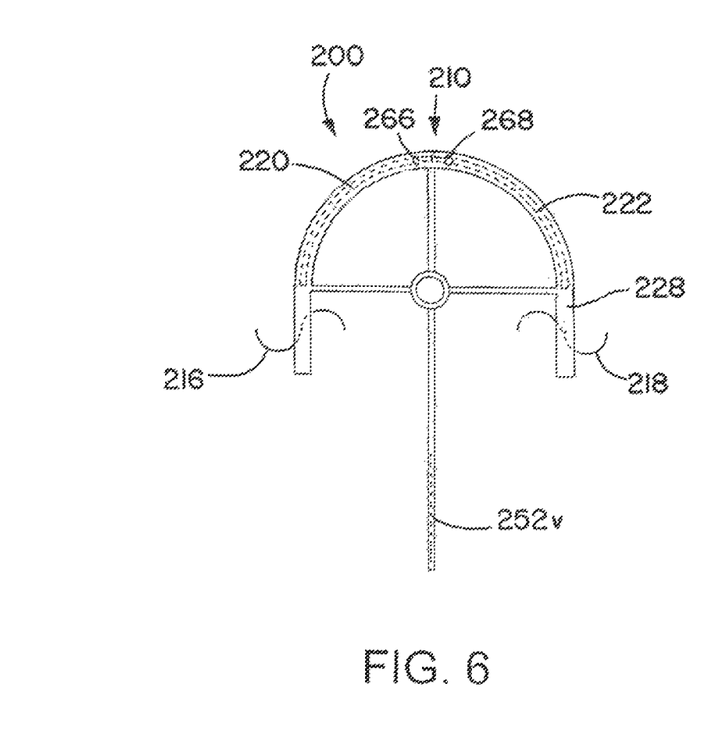
FIG. 6 is a top view of an electrical power generating system in accordance with another embodiment of the present application that utilizes a plurality of segments movable between a first position and a second position.
Figure 7:
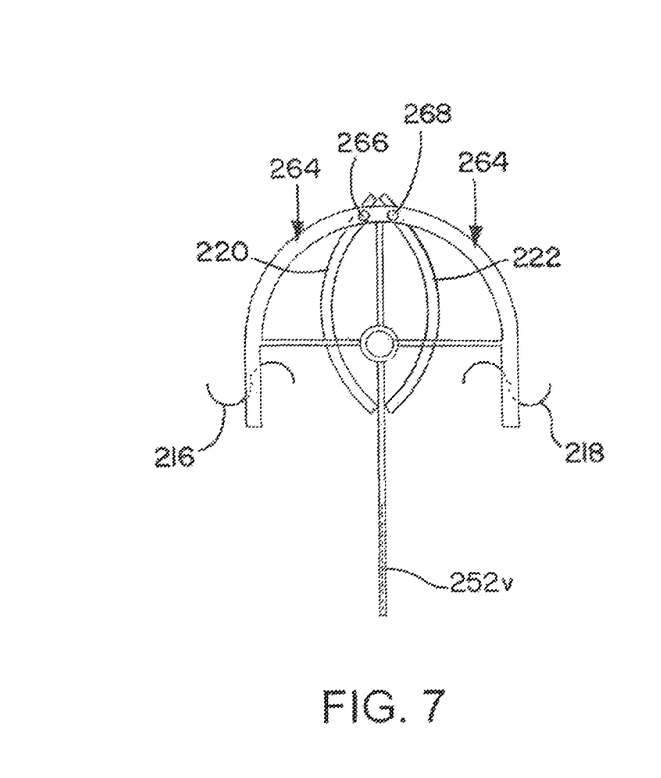
FIG. 7 is a top view of the electrical power generating system of FIG. 6 in a second position indicative of high winds impinging in a distal direction.
Figure 8:
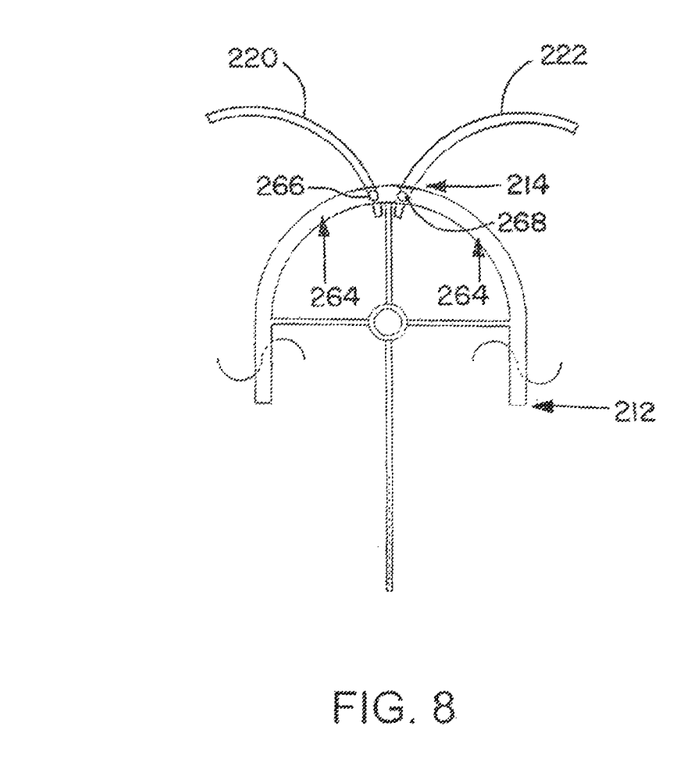
FIG. 8 is a top view of the electrical power generating system of FIG. 6 in a second position indicative of high winds impinging in a proximal direction.

Turning now to FIGS. 6-8 an exemplary embodiment of the electrical power generating system is shown at 200. The electrical power generating system 200 is substantially the same as the above-referenced electrical generating system 100, and consequently the same reference numerals but indexed by 200 are used to denote structures corresponding to similar structures in the electrical power generating system 200. In addition, the foregoing description of the electrical power generating system 100 is equally applicable to the electrical power generating system 200 except as noted below. Moreover, it will be appreciated upon reading and understanding the specification that aspects of the electrical power generating system 100 and electrical power generating system 200 may be substituted for one another or used in conjunction with one another where applicable.

One difference between the systems 100 (FIGS. 1 and 2) and 200 (FIGS. 6-8) is the number of sails and biasing hinge assemblies used.

The wind deflecting structure 210 may include two sails 220, 222 for deflecting wind in a first position and reducing a drag coefficient of the wind deflecting structure 210 in a second position.

Sails 220, 222 may rotatably connect in the wind deflecting structure 210 through biasing hinge assemblies 266, 268. In an embodiment the sails 220, 222 may be rotatably connected through the same biasing hinge assembly. For example, the biasing hinge assembly 266 may include a spring hinge (shown in FIG. 12) and sails 220, 222 may both connect to the biasing hinge assembly 266. The sails 220, 222 may form one or more rigid semi-cylindrical sections that define the wind deflecting structure 210.

Alternatively, the sails 220, 222 or additional sails may define an entire cylindrical section (not shown) of the wind deflecting structure 210, which allows wind amplification of wind in a proximal or distal direction and moving at least one of the sails 220, 222 or additional sails to reduce a wind drag coefficient of the wind deflecting structure 210.

In the first position, the contour of the wind deflecting structure 210 may increase in width from the proximal end 214 to the distal end 212. For example, the contour may be semi-cylindrical. It is noted that the sill 228 and sill 232 (not shown) may be of a shape that follows a curvature of a cross-section perpendicular to a longitudinal axis of the at least one of the sails 220, 222. For example, the sills 228, 232 may follow the path of the semi-cylindrical contour of the sails 220, 222 in the first position. This allows the sills 228, 232 to form part of the contour of the wind deflecting structure 210, and to rotatably connect to the turbines 216, 218 and the sails 220, 222.

In a second position the sails 220, 222 rotate about respective biasing hinge assemblies 266, 268 to reduce a wind drag coefficient of the wind deflecting structure 210. For example, wind may move in a distal direction and the sails 220, 222 may be forced into a second position (FIG. 7) to reduce the wind drag coefficient of the wind deflecting structure 210 compared to the first position. The wind may force the sails 220, 222 to rotate about biasing hinge assemblies 266, 268 to extend distally allowing wind to flow between the sills 228, 232 and through the wind deflecting structure 210. In an embodiment the sails 220, 222, 224, 226 may rotate in the same direction as one another. For example, the sails 220, 222, 224, 226 may connect to respective biasing hinge assemblies that are configured to rotate each sail 220, 222, 224, 226 counter-clockwise about their respective biasing hinge assemblies in response to wind in a proximal direction.

Alternatively, in another second position wind may move in a proximal direction and the sails 220, 222 may be forced into the another second position (FIG. 8) to reduce the wind drag coefficient of the wind deflecting structure 210 compared to the first position. In some circumstances the distal vane 252v may not rotate the wind deflecting structure 210 quickly enough or may not be present. In those circumstances, a shift in wind direction may force the sails 220, 222 to rotate about biasing hinge assemblies 266, 268 to extend proximally allowing wind to flow between the sills 228, 232 and through the wind deflecting structure 210.

Figure 9:
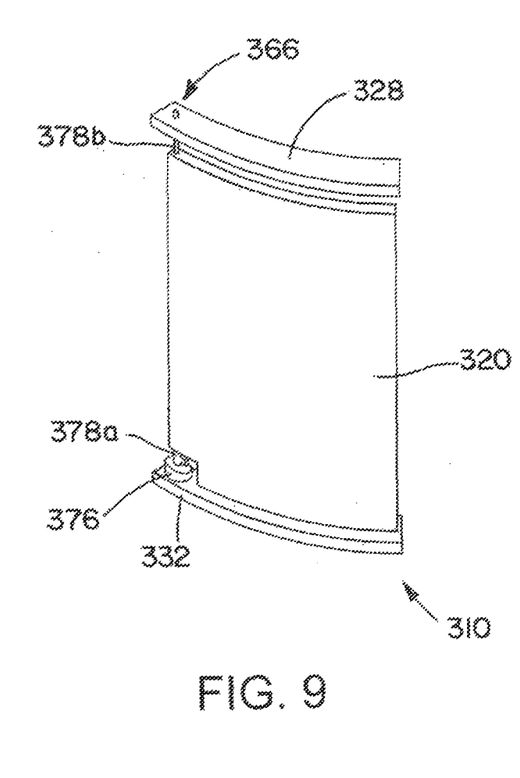
FIG. 9 is a perspective view of a segment with a gravity hinge mount for the segment of a further embodiment of the present application.
Figure 10:
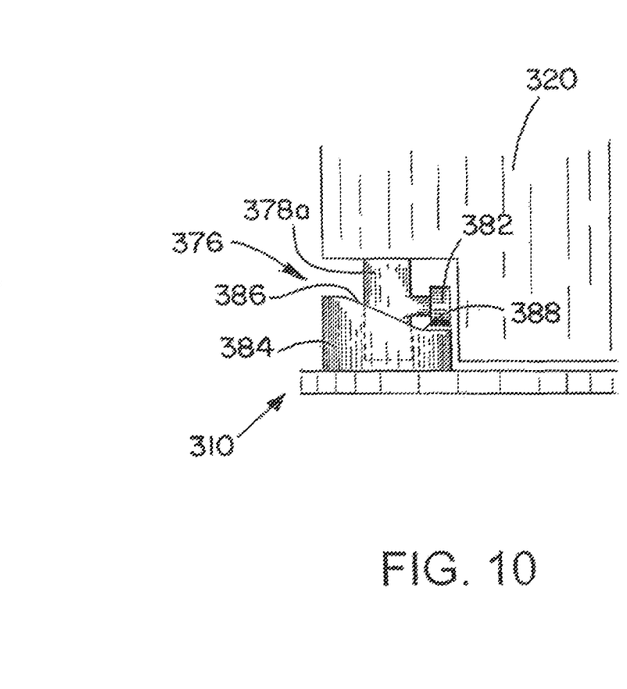
FIG. 10 is a front view of the gravity hinge and a portion of the segment of FIG. 9.

Turning now to FIGS. 9 and 10 an exemplary embodiment of part of a wind deflecting structure is shown at 310. The wind deflecting structure 310 is substantially the same as the above-referenced wind deflecting structures 110, 210 and consequently the same reference numerals but indexed by 300 are used to denote structures corresponding to similar structures in the wind deflecting structure 310. In addition, the foregoing descriptions of the wind deflecting structure 110, 210 are equally applicable to the wind deflecting structure 310 except as noted below. Moreover, it will be appreciated upon reading and understanding the specification that aspects of the wind deflecting structures 110, 210, 310 may be substituted for one another or used in conjunction with one another where applicable.

Figure 12:
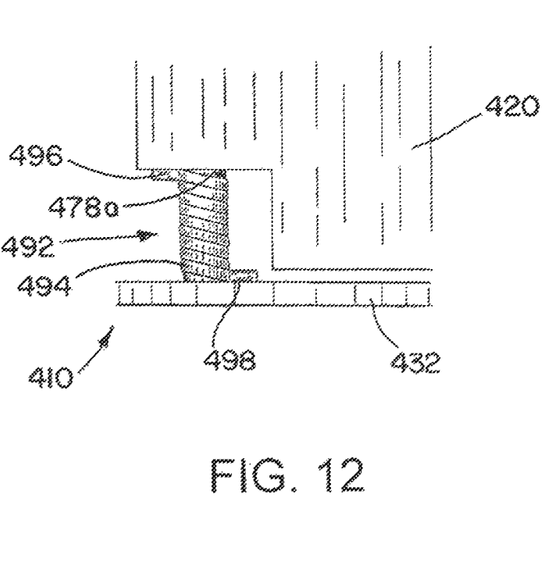
FIG. 12 is a fragmentary front view of the spring hinge and a portion of the segment of FIG. 11.

The sail 320 is pivotally connected to the wind deflecting structure 310 through a respective biasing hinge assembly 348 to allow the sail 320 to rotate relative to the sills 328, 332. The hinge assembly 348 may include a gravity hinge 476, which may be a double action hinge. For example sail 320 may be rotatably connected to sill 328 and sill 332 through an axle 378 extending all the way through the sail 320 from sill 328 to sill 332. In another embodiment the axle may be two parts, one 378b at the top of the sail 320 connected to the sill 328 and the other one 378a at the bottom connected to sill 332.

The axle 378 or axle part 378b may be mounted along a longitudinal axis of the sail 320 to rotatably connect the sail 320 to the sill 328 through an aperture in the sill 328. The axle 378 or axle part 378a may rotatably connect the sail 320 to a gravity hinge 476 attached to the sill 332. The gravity hinge 476 may include a cam roller 382, which radially extends from an end of the axle 378 and an upwardly extending tubular wall 384, whose upper free edge defines a track way 386 on which the cam roller 382 may roll. The cam track way 386 presents a valley point 388, which is connected by a smoothly contoured inclined portion of the track way. The cam roller 382 may be mounted on the end of the axle 378 such that the valley point 388 of the track way normally defines the first position of the sail 320 and the raised part of the track way 386 defines the second position of the sail 320. The sail 320 may swing in a clockwise or counter-clockwise manner. As the sail 320 opens from the first position additional force is required to continue opening the sail 320 to allow wind to pass through gaps 164 (FIGS. 4, 5, 7,8) in the wind deflecting structure 310.

The raised track way 386 may be raised to increase force required to rotate the sail 320, lowered to reduce the force required, or altered asymmetrically to require a different force to rotate the sail 320 in a clockwise direction versus a counter-clockwise direction. Also, the raised track way 386 may be configured to pivot when wind impinging the wind deflecting structure 310 exceeds a predetermined speed. For example, the raised track way 386 may form a 45° angle at the valley point 388 to require a given wind speed, e.g., a non-limiting example being 20 mile/hour wind speed, to move the sail 320 into a second position. The angle at the valley point 388 may be a function of the predetermined speed, wind drag coefficient of the sail 320, and weight of the sail 320.

Alternatively, the biasing hinge 348 may be biased against pivoting in a counter-clockwise or a clockwise direction. For example, the gravity hinge 476 may include a raised track way 386 on one side, but remain at the level of the valley point 388 on the other. This would allow the sail 320 to freely rotate in one direction and requires additional force to move in the other.

A plurality of sails 320 may be connected in the wind deflecting structure 310 to form a contour in a first position directing wind around the contour and allowing wind to pass through gaps in a second position.

Figure 11:
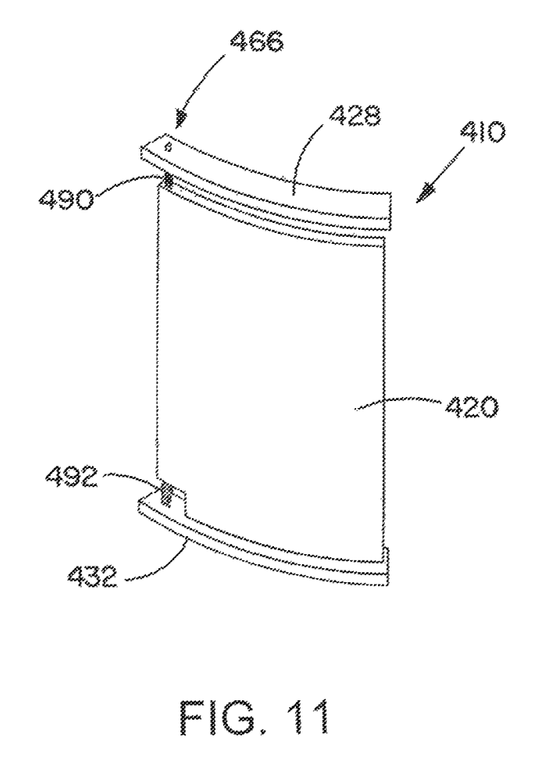
FIG. 11 is a perspective view of a segment with a spring hinge mount of yet another embodiment of the present application.

Turning now to FIGS. 11 and 12 an exemplary embodiment of the wind deflecting structure is shown at 410. The wind deflecting structure 410 is substantially the same as the above-referenced wind deflecting structures 110, 210, 310 and consequently the same reference numerals but indexed by 400 are used to denote structures corresponding to similar structures in the wind deflecting structure 410. In addition, the foregoing descriptions of the wind deflecting structures 110, 210, 310 are equally applicable to the wind deflecting structure 410 except as noted below. Moreover, it will be appreciated upon reading and understanding the specification that aspects of the wind deflecting structures 110, 210, 310, 410 may be substituted for one another or used in conjunction with one another where applicable.

The biasing hinge assembly 448 may include two spring loaded hinges 490, 492. The spring loaded hinge 490 may connect the sail 420 to the sill 428 and the spring loaded hinged 492 may connect the sail 420 to the sill 432. The spring loaded hinges 490, 492 may require additional force against sail 420 to move the sail 420 from a first position to an open second position.

The spring loaded hinge 492 may include an axle 478a, a spring 494, and two wings 496, 498 connected to the spring 494. The spring 494 may be a spiral type spring that wraps around the axle 478a to resist rotation of wing 496 relative to wing 498. Wing 496 may be connected to the sail 420 and wing 498 may be connected to the sill 432 to resist rotation of the sail 420, relative to the sill 432, in the clockwise and the counter-clockwise directions.

Alternatively, the spring 494 may be biased against pivoting in a counter-clockwise or a clockwise direction. For example, the spring 494 may be free to rotate in one direction relative to the sail 420 or the sill 432 or the spring 494 may be configured to resist tightening of the spring 494 more than it resists loosening. This would allow the sail 420 to more freely rotate in one direction and to require additional force to move in the other. Thus, wind moving in one direction would require more force to rotate the sail 420 than wind in the opposite direction against sail 420.

The spring loaded hinge 490 may be configured to rotate in a similar manner to spring loaded hinge 492, and may connect to the sail 420 and the sill 428 in a similar manner to spring loaded hinge 492.

A plurality of sails 420 may be connected to the wind deflecting structure 410 to form a contour in a first position directing wind around the contour and allowing wind to pass through gaps, as shown in FIGS. 4, 5, 7 and 8, in a second position.

Figure 13:
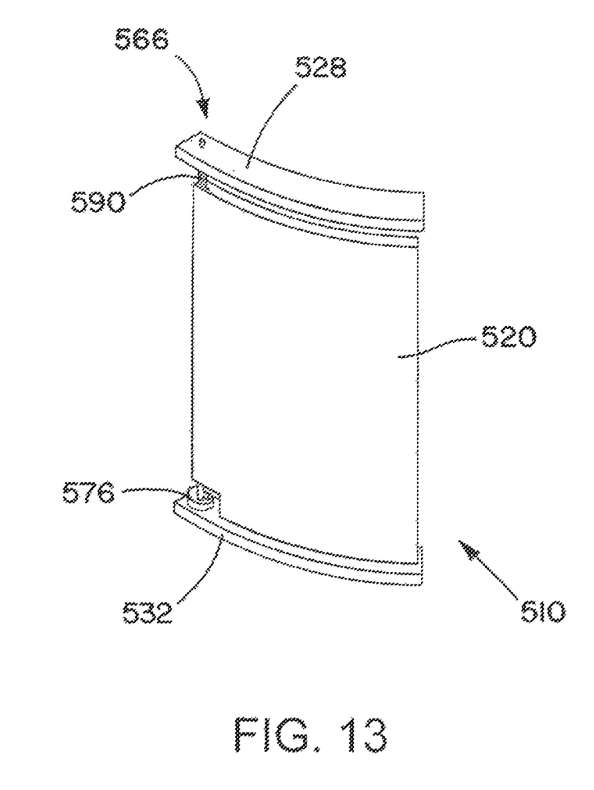
FIG. 13 is a perspective view of a yet further embodiment of a segment having both a spring hinge and a gravity hinge mount.

Turning now to FIG. 13 an exemplary embodiment of the wind deflecting structure is shown at 510. The wind deflecting structure 510 is substantially the same as the above-referenced wind deflecting structures 110, 210, 310, 410 and consequently the same reference numerals but indexed by 500 are used to denote structures corresponding to similar structures in the wind deflecting structure 510. In addition, the foregoing descriptions of the wind deflecting structure 110, 210, 310, 410 are equally applicable to the wind deflecting structure 510 except as noted below. Moreover, it will be appreciated upon reading and understanding the specification that aspects of the wind deflecting structures 110, 210, 310, 410, 510 may be substituted for one another or used in conjunction with one another where applicable.

The wind deflecting structure 510 may include the sail 520 connected to sills 528, 532 through the biasing hinge assembly 548. The biasing hinge assembly 548 may include the spring loaded hinge 590 and the gravity hinge 576. The spring loaded hinge 590 may connect the sail 520 to the sill 528 and the gravity hinge 576 may connect the sail 520 to the sill 532. As the sail 520 opens from the first position additional force is required to continue opening the sail 520.

A plurality of sails 520 may be connected in the wind deflecting structure 510 to form a contour in a first position directing wind around the contour and allowing wind to pass through gaps, as shown in FIGS. 4, 5, 7 and 8, in a second position.

Although the invention has been shown and described with respect to a certain embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. An electrical power generating system including:
   a wind deflecting structure having a contour at a proximal end formed by a plurality of segments that in a first position define the contour;
   a turbine positioned in proximity to a distal end of the wind deflecting structure such that the turbine is drivable by wind passing around the wind deflecting structure; and
   an energy converter coupled to the turbine that converts rotary motions of the turbine into electrical energy;
   wherein at least one of the plurality of segments is movable between the first position defining a corresponding portion of the contour of the wind deflecting structure and a second position that reduces a wind drag coefficient of the wind deflecting structure;
   wherein when in the first position the at least one segment is at least partially laterally offset in a first lateral direction from the turbine such that when wind impinges a first surface of the at least one segment the wind impinging the first surface would be directed from the at least one segment toward the turbine in a second lateral direction; and
   wherein when in the second position a gap that is offset from the turbine in the first lateral direction is formed in the wind deflecting structure at a position of the first surface of the at least one segment in the first position, and a flow path that is offset in the first lateral direction from the turbine extends from the gap toward the distal end such that when wind flows in a first wind direction from the proximal end toward the distal end at least part of the wind would pass through the wind deflecting structure and avoid impinging the turbine;
   whereby at a given wind speed in the first wind direction a total force of the wind exerted against the wind deflecting structure and the turbine is less when in the second position compared to what the total force would be in the first position.

2. The electrical power generating system of claim 1, wherein in the first position the contour increases in width from the proximal end to the distal end.

3. The electrical power generating system of claim 1, wherein the wind deflecting structure at least partially shields the turbine.

4. The electrical power generating system of claim 3, wherein a tangent axis that extends distally from an outer face of the contour of the wind deflecting structure is parallel to, but off-set from, a central wind axis and intersects a distal end of the contour and a sweep path of the turbine; and wherein the tangent axis intersects a central portion of the sweep path of the turbine.

5. The electrical power generating system of claim 1, wherein one or more of the at least one of the plurality of segments are each pivotally connected to the wind deflecting structure through a respective biasing hinge.

6. The electrical power generating system of claim 5, wherein two or more of the at least one of the plurality of segments are each pivotally connected to the wind deflecting structure through respective biasing hinges.

7. The electrical power generating system of claim 5, wherein the biasing hinge is one of a gravity hinge, a spring loaded hinge, or a double action hinge.

8. The electrical power generating system of claim 5, wherein the biasing hinge is configured to pivot from the first position to the second position when wind impinging the wind deflecting structure exceeds a predetermined speed.

9. The electrical power generating system of claim 5, wherein the biasing hinge is biased against pivoting, from the first position to the second position, in a counterclockwise or a clockwise direction.

10. The electrical power generating system of claim 5, further including:
at least one radially outward extending arm extending from a central vertical support member and configured to support at least one of the segments.

11. The electrical power generating system of claim 10, wherein the at least one radially outward extending arm extends from the central vertical support member to the biasing hinge.

12. The electrical power generating system of claim 11, further including:
at least one sill extending from an outward end of the at least one of the plurality of radially outward extending arms to an outward end of a second radially outward extending arm of the plurality of radially outward extending arms;
wherein the at least one sill is of a shape that follows a curvature of a cross-section of the at least one of the plurality of segments perpendicularly to a longitudinal axis of the at least one of the plurality of segments.

13. The electrical power generating system of claim 1, wherein the at least one of the plurality of segments is a sail-type structure.

14. The electrical power generating system of claim 1, wherein the wind deflecting structure is rotatably mounted relative to a ground location.

15. The electrical power generating system of claim 1, further including:
a top sill;
a bottom sill; and
an axle mounted along a longitudinal axis of the at least one of the plurality of segments and configured to mount the at least one of the plurality of segments to the sills.

16. The electrical power generating system of claim 1, wherein the at least one segment is a first segment and the plurality of segments further includes a second segment that is laterally between the first segment and the turbine; and
wherein in the second position the gap is formed between the first segment and the second segment.

17. The electrical power generating system of claim 1, wherein in the second position the at least one segment is offset from the turbine in the first lateral direction such that when wind flows in a first wind direction from the proximal end toward the distal end at least part of the wind would pass through the wind deflecting structure and avoid impinging the turbine.

18. The electrical power generating system of claim 1, wherein the gap is a first gap, the flow path is a first flow path, the at least one segment is a first segment, the turbine is a first turbine, and the plurality of segments further includes:
a second segment that is laterally opposite the turbine relative to the first segment;
wherein the electrical power generating system further includes:
a second turbine positioned laterally offset from the first turbine in the first lateral direction at a laterally opposite side of the wind deflecting structure relative to the first turbine and positioned in proximity to the distal end of the wind deflecting structure such that the second turbine is drivable by wind passing around the wind deflecting structure;
wherein when in the first position the second segment is at least partially laterally offset in the second lateral direction from the second turbine such that when wind impinges a second surface of the second segment the wind impinging the second surface would be directed from the second segment toward the second turbine in the first lateral direction; and
wherein when in the second position a second gap that is offset from the second turbine in the second lateral direction is formed in the wind deflecting structure at a position of the second surface in the first position, and a second flow path that is offset in the second lateral direction from the second turbine extends from the second gap toward the distal end such that when wind flows in a first wind direction from the proximal end toward the distal end at least part of the wind would pass through the wind deflecting structure and avoid impinging the second turbine.

19. The electrical power generating system of claim 1, wherein the gap is laterally offset from the turbine in the first lateral direction parallel to the second lateral direction and perpendicular to the first wind direction such that when in the second position wind would pass through the wind deflecting structure and avoid impinging the turbine.

20. An electrical power generating system including:
a wind deflecting structure having a contour at a proximal end formed by a plurality of segments that in a first position define the contour;
a turbine that has a rotational axis positioned in proximity to a distal end of the wind deflecting structure such that a driven portion of the turbine is drivable by wind passing around the wind deflecting structure; and
an energy converter coupled to the turbine that converts rotary motion of the turbine into electrical energy;
wherein at least one of the plurality of segments is movable between the first position defining a corresponding portion of the contour of the wind deflecting structure and a second position that reduces a wind drag coefficient of the wind deflecting structure; and
wherein the at least one segment is actuatable by the wind to move relative to the rotational axis of the turbine from the first position to the second position;
whereby at a given wind speed in the first direction a force of the wind driving the driven portion of the turbine is less when in the second position compared to what the force would be in the first position.

21. A method of generating electrical power including the steps of:

directing wind to at least one turbine in proximity to a distal end of a wind deflecting structure having a contour at a proximal end formed by a plurality of segments that in a first position define the contour such that the turbine is driven by wind passing around the wind deflecting structure, wherein when in the first position the at least one segment is at least partially laterally offset in a first lateral direction from the turbine such that wind impinging a first surface of the at least one segment is directed from the at least one segment toward the turbine in a second lateral direction;

converting rotary motion of the turbine into electrical energy; and reducing a wind drag coefficient of the wind deflecting structure in a second position by moving at least one of the plurality of segments of the wind deflecting structure, wherein when in the second position a gap that is offset from the turbine in the first lateral direction is formed in the wind deflecting structure at a position of the first surface of the at least one segment in the first position, and a flow path that is offset in the first lateral direction from the turbine extends from the gap toward the distal end such that wind flowing in a first wind direction from the proximal end toward the distal end at least partially passes through the wind deflecting structure and avoids impinging the turbine;

whereby at a given wind speed in the first wind direction a total force of the wind exerted against the wind deflecting structure and the turbine is less when in the second position compared to what the total force would be in the first position.

22. The method of generating electrical power of claim 21, further including the step of:

rotating the at least one segment independent of the rest of the wind deflecting structure.

\* \* \* \* \*